United States Patent

[11] 3,601,361

[72] Inventors Eckard Hundhausen;
Walter Kolb, both of Betzdorf, (Sieg), Germany
[21] Appl. No. 845,280
[22] Filed July 28, 1969
[45] Patented Aug. 24, 1971
[73] Assignee Wolf-Gerate GmbH
Betzdorf, (Sieg), Germany
[32] Priority Aug. 9, 1968
[33] Austria
[31] 7844/68

[54] PLUG-IN COUPLING FOR GARDEN AND OTHER HOSES
7 Claims, 4 Drawing Figs.

[52] U.S. Cl. .................................... 251/149.1, 285/316, 285/319, 285/250
[51] Int. Cl. .................................... F16l 37/28, F16l 37/26
[50] Field of Search .......................... 251/149.1, 149.6; 285/1, 315, 316, 319, 277, 250

[56] References Cited
UNITED STATES PATENTS

| | | | |
|---|---|---|---|
| 1,904,061 | 4/1933 | Larson | 251/149.1 X |
| 2,388,992 | 11/1945 | Pape et al. | 285/250 |
| 2,727,759 | 12/1955 | Elliott | 251/149.6 X |
| 2,750,209 | 6/1956 | Robb | 251/149.6 |
| 3,039,794 | 6/1962 | De Cenzo | 285/316 X |
| 3,334,860 | 8/1967 | Bolton, Jr. | 251/149.1 |

Primary Examiner—William R. Cline
Attorney—Ostrolenk, Faber, Gerb & Soffen

ABSTRACT: A hose coupling with male and female parts; the male part having a double conical bead for being engaged by fingers on the female part; the fingers have notches formed of cooperatingly sloped surfaces which receive the bead; the external surfaces of the fingers are obliquely sloped; a sleeve surrounds the female part; it has a cooperatingly sloped surface engaging the outer surface of the fingers; as the hose coupling parts are pressed together, the male part forces the fingers outward and the cooperating outer surfaces of the fingers and the sleeve surfaces cause the sleeve to shift along the female part and permit the fingers to move outward to receive the male part, which snaps into the notches in the fingers.

Inventors
ECKARD HUNDHAUSEN
WALTER KOLB
By
OSTROLENK, FABER, GERB & SOFFEN
ATTORNEYS Inventors
ECKHARD HUNDHAUSEN
WALTER KOLB
By
OSTROLENK, FABER, GERB & SOFFEN
ATTORNEYS

PLUG-IN COUPLING FOR GARDEN AND OTHER HOSES

Plug-in couplings for garden hoses have been proposed in which a sliding sleeve is arranged on the female part of the hose. The sleeve actuates a ball detent by moving it, against a spring, longitudinally into a position in which the ball detent is released in order to be able to plug the two coupling halves together or to separate them from each other. Apart from the fact that such couplings made of metal require extremely accurate machining and are therefore costly to manufacture, their manipulation is complex. To plug such hoses together, while the two hose ends are being held in the two hands, it is also necessary to push back the sliding sleeve against the spring force. This requires considerable concentration. For undoing the coupling, on the other hand, the sliding sleeve must be gripped with the fingers. While the end of the hose connected with the male part of the coupling is pulled away, the sliding sleeve is slid back on the female part so that the detent is released and the two coupling parts can be separated. Since, however, the sliding sleeve is comparatively short, this manipulation, that is to say the engagement of the sliding sleeve with the fingers, is difficult.

One aim of the invention is to avoid these disadvantages of the known construction. Another aim is to provide a plug-in coupling which is simpler to use and is so simple in its construction that its essential parts can be made of synthetic resin.

The invention concerns a plug-in coupling for garden and other hoses. On the female part of the coupling, a coupling sleeve is provided which brings about a locking of the male part. The sleeve can be pushed back by hand against a resilient force characterized in that the locking means are provided on the female part of the coupling.

Further details and advantages of the invention will be found in the following description of a specific embodiment referring to the drawing.

Figure 1:
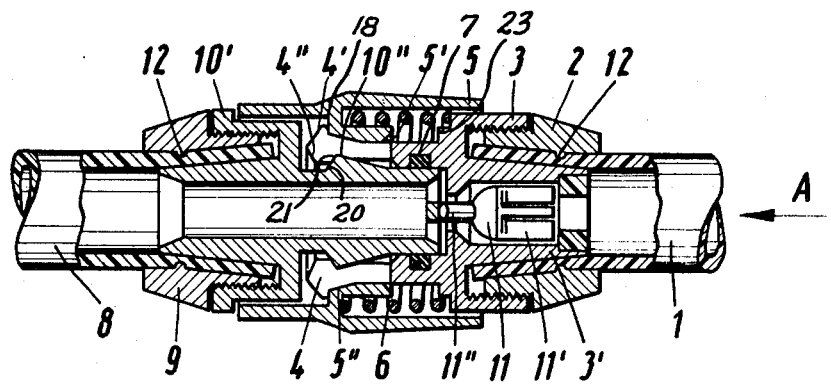
FIG. 1 is an axial section of a plug-in coupling in accordance with the invention with the two halves together.

As can be seen from FIG. 1, the female, right-hand part 3 of the coupling is connected with the hose end 1 by means of a gripping part which is screwed into a female thread in the rest of the female part 3 and has its conical inner surface arranged so as to clamp the hose on the conically shaped spigot 3'. As an additional securing means it is possible to provide one or more annular or helical ribs 12 on the inner surface of the gripping part 2, or alternatively suitable projections or the like, which press into the outer face of the hose. The direction of water flow is indicated by arrow A.

Figure 4:
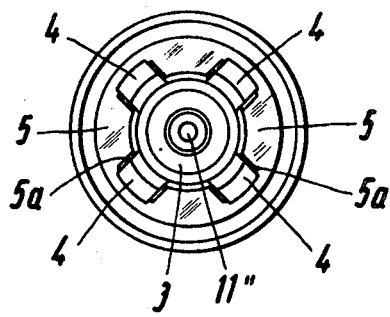
FIG. 4 is a view on the line IV—IV of FIG. 3.

The female part 3 has towards its other end four holding fingers 4, which are spaced by 90° (FIG. 4) about the coupling axis and can move resiliently in a radial direction. The female part 3 with the spigot 3' and the holding fingers 4 are a single integrally moulded synthetic resin part. The outer head parts of the fingers 4 have a shape as demanded by the manner of operation described below. It is also possible to provide a greater number of holding fingers 4, for example eight, spaced evenly around the end of part 3.

Figure 3:
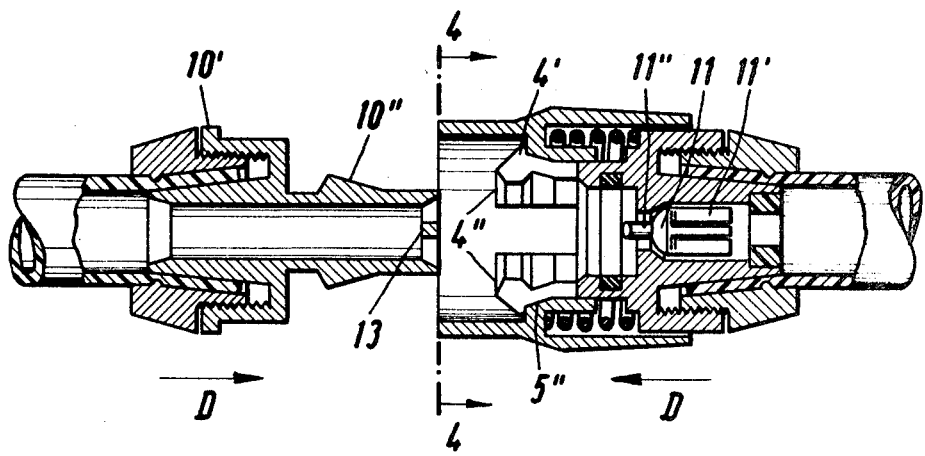
FIG. 3 shows the same coupling before the plugging together of the two coupling halves.

On the female part 3 there is a sliding sleeve 5 which can slide in the longitudinal direction and is pressed by helical compression spring 6 so as normally to be in the rest position shown in FIGS. 1 and 3. Sleeve 5 has an inner shoulder 18, which rests against the radially outwardly extending holding projections 4' of the fingers 4. The oblique face 5'' of the sliding sleeve 5 rests against the corresponding oblique faces 19 of the fingers 4. Reference numeral 7 denotes a sealing ring.

The other hose end 8 is fixed by means of the screwed on gripping part 9 against the double conical connecting spigot of the male part 10 which, in the plugged-in condition in accordance with FIG. 1, has the inner oblique face 20 of its double-conical bead resting against the inwardly projecting outer oblique faces 21 of the notch as in holding fingers 4. Male part 10 is nonshiftably held in place because the outer oblique face 10 of the bead of male part 10 meets the inner oblique faces 22 of the notches in fingers 4 and because the fingers 4 abut against the oblique face 5'' of the sliding sleeve 5 which prevents their moving outward.

Figure 2:
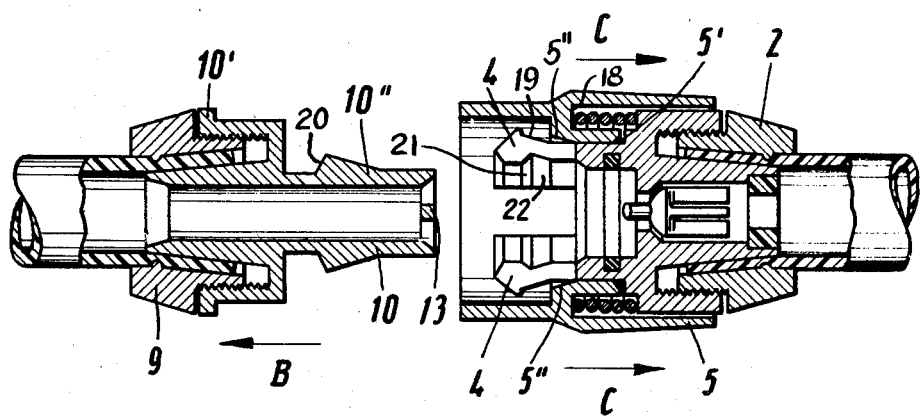
FIG. 2 shows the same coupling with the coupling parts detached.

In order to undo the coupling, the hose end shown on the left in FIG. 2 is grasped with one hand in order to draw it in the direction of the arrow B, while the sliding sleeve 5 is grasped with the other hand in order to push it in the direction of the arrows C, so that it slides, as shown in FIG. 2, over the female part until its interior shoulder 5' abuts against the opposite shoulder 23 of the female part 3. In this position the oblique face 5'' is clear of the resilient fingers 4 so that they can be moved outward. When male part 10 is now drawn to the left, oblique surface 21 will shift fingers 4 outward until male part 10 is free. Consequently, the male part 10 can be removed with little effort. The sliding sleeve 5 then returns to its rest position shown in FIGS. 1 and 3. In order to prevent the sliding sleeve 5 being displaced unintentionally, for example when the garden hoe is drawn with the coupling over a lawn, the male part 10 is provided with an annular bead or collar 10' which protects the end of the sliding sleeve 5 from unintentional displacement.

In order to couple the hose parts again, the two hose ends are taken in the two hands, as shown in FIG. 3, and are pushed in the directions of the arrows D toward each other. The outer oblique face 10'' of the annular bead of the male part 10 abuts against the end oblique faces 4'' of the fingers 4 so that the latter are pressed outward. This pressure is transmitted by the outer oblique faces of the fingers 4 to the abutting oblique face 5'' of the sleeve 5 so that the latter is moved to the right a small distance out of its rest position. The fingers 4 can be displaced outwards owing to the pressing action of the oblique face 10'' of the male part so that the male part 10 can pass back into its position shown in FIG. 1 again.

In order to provide for automatic stopping of the flow of water occurring when the hose coupling is undone, should the water tap not yet be turned off, it is possible to provide, in accordance with the invention, for a check valve in the spigot 3' of the female part 3. This valve consists of a semispherical valve body 11 which on the one hand side has a guide vane 11' and on the other hand side a push rod 11''. When the hose is coupled the end of the male part 10 presses through a web 13 against the push rod 11'' so that the valve is held in the open position. When the hose parts are uncoupled the valve body 11 is pressed by the water pressure acting in the direction A against its valve seating provided in part 3, so that the flow of water is arrested.

All parts of the coupling, with the exception of the spring 6, can be made of a suitable synthetic resin.

Preferably the arrangement is such that the sliding sleeve 5 cannot be turned although it can be moved longitudinally, by providing longitudinal ribs or grooves on the interior surface of the sliding sleeve 5 so as to engage corresponding grooves or longitudinal ribs on the female part 3. In the case of the embodiment shown, see FIG. 4, longitudinal grooves 5a are provided on the sliding sleeve 5 into which the fingers 4 fit so that the latter prevent any twisting of the sliding sleeve. This provides the advantage that the sliding sleeve 5 can be held with one hand in order to screw in or unscrew the gripping part 2.

What we claim is:

1. A plug-in hose coupling comprising a male and a female part;

said male part being connectable with one section of a hose and comprising a double conical bead having an inner sloping, oblique face and an outer sloping, oblique face, with both said oblique faces meeting at their widest parts and sloping radially inward with respect to said male part away from the meeting point of the sloping faces;

said female part being connectable with another hose section and comprising a plurality of resilient locking fingers, which normally assume a position that biases said fingers radially inward with respect to said female part so as to lock said male part;

said fingers each including a notch having an outer oblique face, which is sloped to mate with said inner face of said male part bead, and having an inner face, which is sloped to mate with said outer face of said male part bead;

said fingers each further including an outer surface portion, which is obliquely sloped radially inward with respect to said female part in the direction away from said male part;

a sleeve connected with and encircling said female part in the vicinity of the junction with said male part; said sleeve being lengthwise movable along said female part; said sleeve having a cooperatingly sloped surface to mate with said finger outer surface portion;

a spring on said coupling connected to normally urge said sleeve to move toward said male part and to move its said sloped surface into engagement with said finger outer surface portions thereby to lock the fingers against being shifted radially outward;

whereby when said male and said female parts are to be coupled and said bead of said male part is pushed against said female part fingers, said bead outer face pushes said fingers radially outward and, due to the sloping cooperating surfaces on said fingers and said sleeve, pushes said sleeve along said female part and away from said male part; thereby permitting the radially outward movement of said fingers to admit said male part, and thereafter said male part bead becomes engaged and locked by said cooperating oblique surfaces of said fingers.

2. A plug-in coupling in accordance with claim 1, characterized in that said fingers each have external holding projections against which said sleeve is normally biased.

3. A plug-in coupling in accordance with claim 1, characterized in that said female part includes a connecting spigot including a check valve having a push rod which is pressed back from the closed into the open position by means of a web which is provided at the end of the male part and which operates on said valve when the coupling is done.

4. A plug-in coupling in accordance with claim 1, characterized in that one of said sleeve and said female part is provided with internal longitudinal ribs and the other is provided with corresponding grooves which engage said ribs in order to prevent twisting of said sleeve.

5. A plug-in coupling in accordance with claim 4, characterized in that on the sliding sleeve internal grooves are cut which each receive a finger.

6. A plug-in coupling in accordance with claim 1, wherein said sleeve extends over and encircles the portion of said male part that is near said female part.

7. A plug-in coupling in accordance with claim 6, characterized in that on the male part there is an annular bead or collar which protects the adjacent end face of the sliding sleeve against unintentional actuation.